US006672077B1

(12) United States Patent
Bradley et al.

(10) Patent No.: US 6,672,077 B1
(45) Date of Patent: Jan. 6, 2004

(54) HYDROGEN STORAGE IN NANOSTRUCTURE WITH PHYSISORPTION

(75) Inventors: Keith Bradley, El Cerrito, CA (US); Philip G. Collins, Oakland, CA (US); Jean-Christophe P. Gabriel, Pinole, CA (US); Young-Kyun Kwon, Albany, CA (US); Seung-Hoon Jhi, Albany, CA (US); George Grüner, Los Angeles, CA (US)

(73) Assignee: Nanomix, Inc., Emeryville, CA (US)

( * ) Notice: Subject to any disclaimer, the term of this patent is extended or adjusted under 35 U.S.C. 154(b) by 82 days.

(21) Appl. No.: 10/020,392

(22) Filed: Dec. 11, 2001

(51) Int. Cl.[7] .................................................. F17C 11/00
(52) U.S. Cl. ...................................................... 62/46.1
(58) Field of Search ................................. 62/45.1, 46.1, 62/46.2, 440, 451

(56) References Cited

U.S. PATENT DOCUMENTS

| 4,960,450 | A | 10/1990 | Schwarz et al. ................ 62/18 |
| 5,653,951 | A | 8/1997 | Rodriguez et al. ........... 423/439 |
| 6,159,538 | A | 12/2000 | Rodriguez et al. ...... 427/213.31 |
| 6,231,980 | B1 | 5/2001 | Cohen et al. ................ 428/402 |
| 6,290,753 | B1 | 9/2001 | Maeland et al. ............... 95/116 |

OTHER PUBLICATIONS

Ralph T. Yang, "Hydrogen Storage By Alkali–doped Carbon Nanotubes–revisited", Carbon vol. 38 (2000), pp. 623–626.
P. Chen et al., "High $H_2$ Uptake By Alkali–doped Carbon Nanotubes Under Ambient Pressure And Moderate Temperatures", Science vol. 285 (Jul. 2, 1999), pp. 91–93.
K. Murata et al., "Pore Structure Of Single–wall Carbon Nanohorn Aggregates", Chemical Physics Letters vol. 331, (Nov. 24, 2000), pp. 14–20.
Y. Ye et al., "Hydrogen Adsorption And Phase Transitions In Fullerite", Applied Physics Letters vol. 77, No. 14, (Oct. 2, 2000), pp. 2171–2173.
Chambers et al., "Hydrogen Storage in Graphite Nanofibers," The Journal of Physical Chemistry B., vol. 102, No. 22, May 28, 1998, pp. 4253–4256.
Dillon et al., "Storage of hydrogen in single–walled carbon nanotubes," Letters to Nature, vol. 386, Mar. 27, 1997, pp. 377–379.
Poirier et al., "Hydrogen adsorption in carbon nanostructures," International Journal of Hydrogen Energy 26, 2001, pp. 831–835.

(List continued on next page.)

*Primary Examiner*—Denise L. Esquivel
*Assistant Examiner*—Malik N. Drake

(57) ABSTRACT

A hydrogen containing nanostructure is provided, where the hydrogen is adsorbed to the nanostructure by physisorption. The nanostructure includes light elements, selected from the second and third rows of the periodic table. The nanostructure is formed as a layered network of light elements coupled with covalent $sp^2$ bonds. The chemical composition of the nanostructure can be such that the desorption temperature of hydrogen is greater than the liquefaction temperature of nitrogen, 77 K. Further, a hydrogen storage system is provided, including a container and a nanostructured storage material within the container, wherein the nanostructured storage material includes light elements, and the nanostructured storage material is capable of adsorbing hydrogen by physisorption. The hydrogen storage system can include a liquid nitrogen based cooling system, capable of cooling the nanostructured storage material below the desorption temperature of hydrogen. Some embodiments contain a heater to control the temperature of the nanostructured storage material.

30 Claims, 10 Drawing Sheets

OTHER PUBLICATIONS

Han et al., "Pyrolytically grown arrays of highly aligned $B_xC_yN_z$ nanotubes," Applied Physics Letters, vol. 78, No. 18, Apr. 30, 2001, pp. 2769–2771.

Cumings et al., "Mass–production of boron nitride double–wall nanotubes and nanococoons," Chemical Physics Letters 316, 2000, pp. 211–216.

Weng–Sieh et al., "Synthesis of $B_xC_yN_z$ nanotubules," Physical Review B, vol. 51, No. 16, Apr. 15, 1995, pp. 229–232.

Wu et al., "Superconducting $MgB_2$ Nanowires," Advanced Materials, vol. 13, No. 19, Oct. 2, 2001, pp. 1487–1489.

Eckerlin et al., "Zur Kenntnis des systems $Be_3N_2$—$Si_3N_4$: Die Struktur einer neuen Modifikation von $Be_3N_2$," Zeitschrift für anorganische und allgemeine Chemie, vol. 304, 1960, pp. 218–229.

Felner, I., "Absence of superconductivity in $BeB_2$," Physica C, vol. 353, 2001, pp. 11–13.

La Placa et al., "Boron Clusters ($B_n$, n=2–52) produced by laser ablation of hexagonal boron nitride," Chemical Physics Letters, vol. 190, No. 3,4, Mar. 6, 1992, pp. 163–167.

Tracy Hall et al., "Group IV Analogs and High Pressure, High Temperature Synthesis of $B_2O$," Inorganic Chemistry, vol. 4, No. 8, Aug. 1965, pp. 1213–1216.

Ruthven, Douglas M., "Adsorption, Fundamentals," Kirk–Othmer Encyclopedia of Chemical Technology, Apr. 16, 2001 (Online Posting Date), 34 pp.

Dillon et al., "A Simple and Complete Purification of Single–Walled Carbon Nanotube Materials," Advanced Materials, vol. 11, No. 16, 1999, pp. 1354–1358.

Duesberg et al., "Chromatographic size separation of single–wall carbon nanotubes," Applied Physics A, vol. 67, 1998, pp. 117–119.

Shelimov et al., "Purification of single–wall carbon nanotubes by ultrasonically assisted filtration," Chemical Physics Letters, vol. 282, 1998, pp. 429–434.

Tak et al., "A new purification method of single–wall carbon nanotubes using $H_2S$ and $O_2$ mixture gas," Chemical Physics Letters, vol. 344, 2001, pp. 18–22.

Young et al., "High yield purification of multiwalled carbon nanotubes by selective oxidation during thermal annealing," Carbon, vol. 39, 2001, pp. 655–661.

Ashraf Imam et al., "Hydrogen Storage on Carbon–Based Nanomaterials," NANOTUBE 2001, $2^{nd}$ International Workshop on the Science and Application of Nanotubes, 2001, 30 pp.

International Search Report dated Apr. 8, 2003.

HYDROGEN STORAGE IN NANOSTRUCTURE WITH PHYSISORPTION

REFERENCE TO CROSS-RELATED APPLICATIONS

The present application is related to U.S. patent application entitled: "Increasing Hydrogen Adsorption For Hydrogen Storage In Nanostructured Materials By Modifying sp2 Covalent Bonds" by Young-Kyun Kwon, Seung-Hoon Jhi, Keith Bradley, Philip G. Collins, Jean-Christophe P. Gabriel, and George Gruiner, attorney docket number M- 12324, filed on the same date as the present application and incorporated herein in its entirety by this reference.

BACKGROUND

1. Field of Invention

The invention relates to hydrogen storage systems, more particularly to the storage of hydrogen in systems that include nanostructures of combinations of light elements.

2. Description of Related Art

Hydrogen storage is the key unsolved problem of producing fuel cells for hydrogen-powered automobiles or portable energy devices. In particular, storing hydrogen in large quantities safely and in a light container has proved prohibitively difficult so far.

Several different techniques have been developed to tackle this problem. In some approaches hydrogen is stored in tanks under high pressure, for example, 300 atm. In other techniques hydrogen is liquefied at temperatures below 20 K with a helium-based cooling system. Both of these techniques pose problems for practical use in automobiles. All of the hydrogen is available for catastrophic release in an accident, raising the risk of explosion or fire. Furthermore, in order to store enough hydrogen to match the range of present day automobiles, the container has to have a volume of at least 50 gallons. Also, both in the high pressure technique and in the helium cooled technique the required containers are heavy, and therefore inefficient for storage. Finally, both techniques also consume a lot of energy for generating the high pressure or for liquefying the hydrogen.

Some other techniques adsorb hydrogen into solid materials. Several types of materials have been studied in this respect, including metal hydrides and glass microspheres. However, the materials investigated so far all have low hydrogen storage capacity, making them non-competitive with gasoline.

Hydrogen can be stored in carbon nanostructures, such as graphite and carbon nanofibers, according to the papers of A. Dillon et al. in Nature, vol. 386, p. 377 (1997), A. Chambers et al. in J. Phys. Chem. B vol. 102, p. 3378 (1998), and E. Poirier et al. in Int. J. of Hydrogen Energy, vol. 26, p. 831 (2001), and according to U.S. Pat. No. 5,653,951: "Storage of hydrogen in layered nanostructures," by N. Rodriguez and R. Baker; and U.S. Pat. No. 4,960,450: "Selection and preparation of activated carbon for fuel gas storage," by J. Schwarz et al. Furthermore, hydrogen storage in Al and Si containing zeolites and microporous materials has been explored previously.

Nanostructures can be defined as atomic structures that have a spatial extent of less than a few hundred nanometers in one, two, or all three dimensions. A class of nanostructures is formed by planar networks, sometimes referred to as layered compounds. Layered compounds are often formed by elements coupled with $sp^2$ bonds. The origin of the $sp^2$ bonds will be presented on the example of elements of the second row of the periodic table, including boron, carbon and nitrogen.

FIG. 1 shows an example of a second row element 4 coupled with $sp^2$ bonds, or orbitals, 8 to three other elements 12. The s orbital of the second row elements is filled with two electrons, and the p orbitals are partially filled. For example, boron has one electron, carbon has two, and nitrogen has three electrons in the p orbitals. When the second row elements form chemical bonds, one of the s electrons is promoted into an empty p orbital—for example into the $p_z$ orbital in carbon, leaving only one s electron. This one s electron and two of the p electrons first hybridize into three s hybrid orbitals. The remaining p electrons—none in boron, one in carbon, and two in nitrogen—occupy an orbit that does not participate in the bonding. The three hybridized electrons repel each other, and hence form three $sp^2$ orbitals 8 as far as possible away from each other. An optimal configuration is when the three $sp^2$ orbitals 8 make 120 degrees with each other, defining a plane. Connecting several second row elements with planar $sp^2$ orbitals 8 spans the defined plane, thus forming the aforementioned planar networks.

Possible planar networks of the $sp^2$ bonded materials include triangular lattices. Large sections of a planar network can be deformed to create various nanostructures. Nanostructures that are based on $sp^2$ bonded triangular lattices include different classes of nanotubes, nanococoons, nanoropes, nanofibers, nanowires, nanohorns, and nanocages.

Storing hydrogen in $sp^2$ bonded nanostructures has the following advantages. Hydrogen, adsorbed to the nanostructures, desorbs over a range of temperatures, and thus it is not available for catastrophic release, for example, in case of an automobile accident. Furthermore, because of their large surface area, nanostructures are capable of adsorbing very large quantities of hydrogen, giving rise to a much higher weight % storage efficiency than the aforementioned high pressure and cooling techniques.

However, the above works have the following disadvantages. Typically they considered hydrogen storage at ambient temperatures, where the storage capacity fell far short of the theoretical value, making those works economically non-viable. Also, the works that considered storage at other temperatures reported insufficient storage efficiencies.

In particular, U.S. Pat. No. 5,653,951 considered hydrogen storage in carbon nanostructures, utilizing chemisorption. As described below in detail, chemisorption binds hydrogen to the carbon nanostructure by forming a chemical bond that is typically quite strong. Therefore, chemisorptive bonds can change the chemical composition and structure of the storage material itself. This is a drawback for storage applications, as the storage system has to be operated cyclically without structural degradation in order to be useful.

Also, because of the formation of chemical bonds, the hydrogen might be recovered from the storage material in an altered chemical form, for example, methane. This again reduces the usefulness of storage materials, which form chemisorptive bonds.

Therefore, there is a need for hydrogen storage systems that contain $sp^2$ bonded nanostructures, wherein the chemical composition of the nanostructure is selected to ensure high storage efficiency, the storage system operates at technically advantageous temperatures, and in particular wherein the mechanism of hydrogen adsorption is not chemisorption.

SUMMARY

In accordance with the invention, a hydrogen containing nanostructured storage material is provided, where the hydrogen is adsorbed to the nanostructured storage material by physisorption. The nanostructured storage material includes light elements, belonging to the second and third rows of the periodic table. More specifically, the light elements are selected from Be, B, C, N, O, F, Mg, P, S, and Cl. The chemical composition of the nanostructured storage material is such that the desorption temperature, at which hydrogen desorbs from the nanostructured storage material, is greater than the liquefaction temperature of nitrogen, 77 K. Some chemical compositions that give rise to a desorption temperature in excess of 77 K are: $B_xC_yN_z$, BN, $BC_2N$, $MgB_2$, $Be_3N_2$, $BeB_2$, $B_2O$, B, BeO, $AlCl_3$, $Al_4C_3$, $AlF_3$, $Al_2O_3$, $Al_2S_3$, $Mg_2Si$, $Mg_3N_2$, $Li_xN_y$, $Li_xS_y$, and $Na_xS_y$, where x, y, and z are integers.

The nanostructured storage material is formed as a layered network of light elements, coupled with covalent $sp^2$ bonds. The layered network can be a triangular lattice, a nanofiber, a nanoplatelet, a single walled nanotube, a multi walled nanotube, a nanocage, a nanococoon, a nanorope, a nanotorus, a nanocoil, a nanorod, a nanowire, and a fullerene. The layered network can also have a heterogeneous form, including a combination of the above structures, as well as embodiments where various parts of the network can have different chemical composition.

According to another embodiment of the invention, a hydrogen storage system is provided. The hydrogen storage system includes a container and a nanostructured storage material within the container, wherein the nanostructured storage material includes light elements, and the nanostructured storage material is capable of adsorbing hydrogen by physisorption. The nanostructured storage material can be, for example, any of the above-described embodiments. The nanostructured storage material can be combined with a hydrogen distribution system to facilitate the efficient flow of hydrogen.

In some embodiments the hydrogen storage system further includes a cooling system, capable of cooling the nanostructured storage material below the desorption temperature of hydrogen in relation to the nanostructured storage material. In some embodiments the cooling system includes a middle container within the container, separated by vacuum, an inner container within the middle container, and liquid nitrogen between the middle container and the inner container. The nanostructured storage material is within the inner container. Some embodiments contain a heater to control the temperature of the nanostructured storage material.

DETAILED DESCRIPTION

Figure 1:
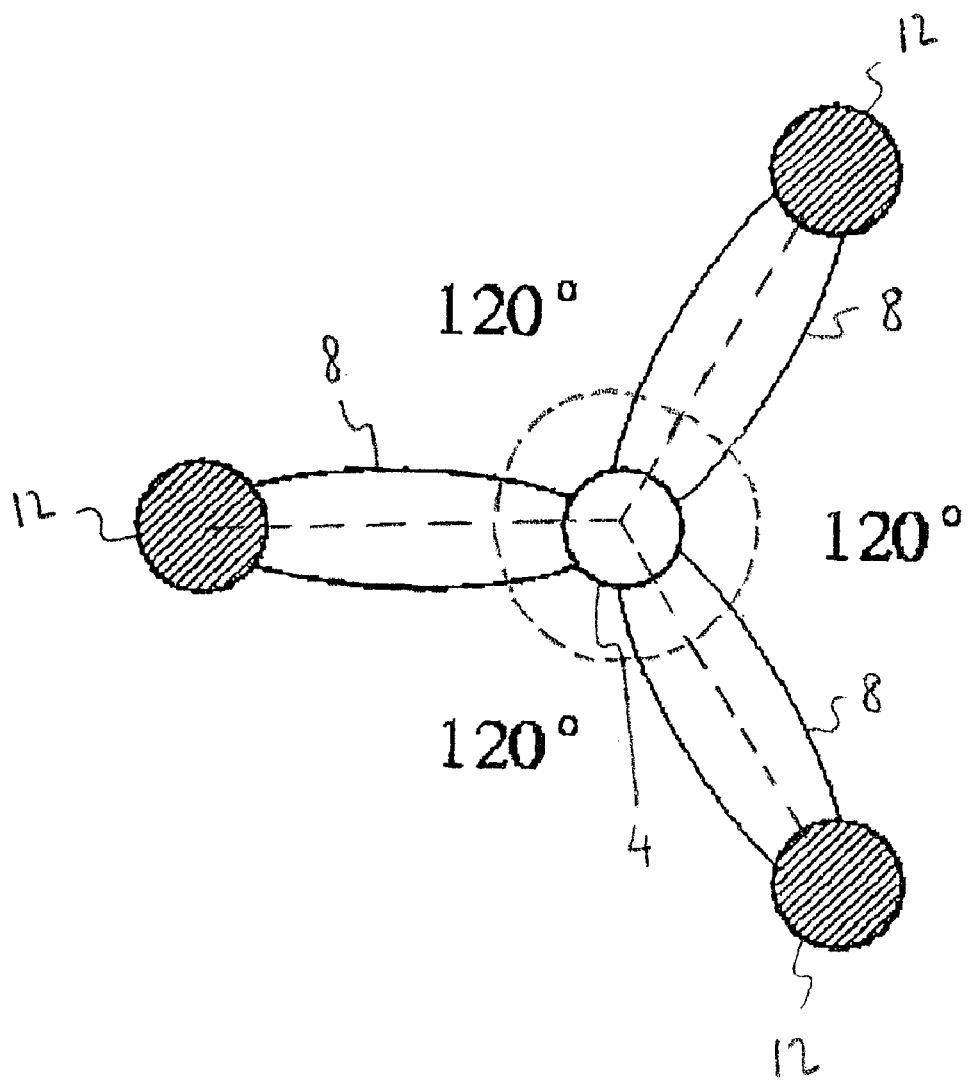
FIG. 1 illustrates an element with $sp^2$ bonds.
Figure 2A:
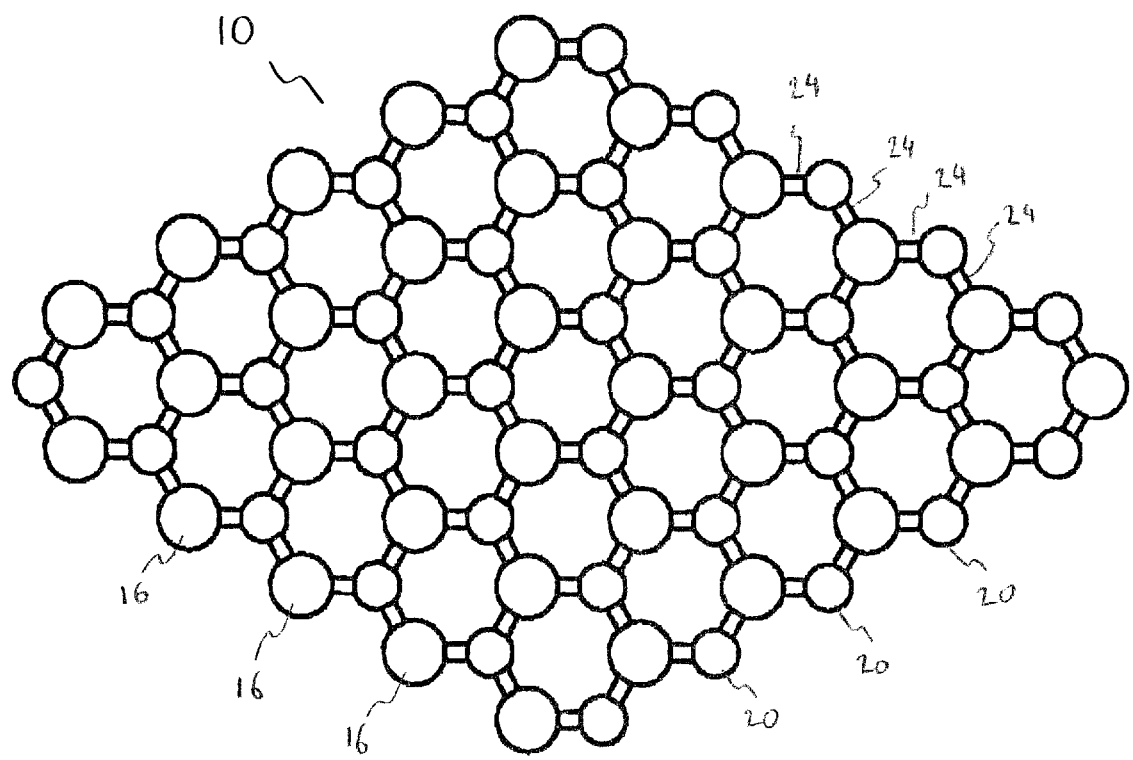
FIG. 2A illustrates a plan view of a honeycomb nanostructured storage material.
Figure 2B:
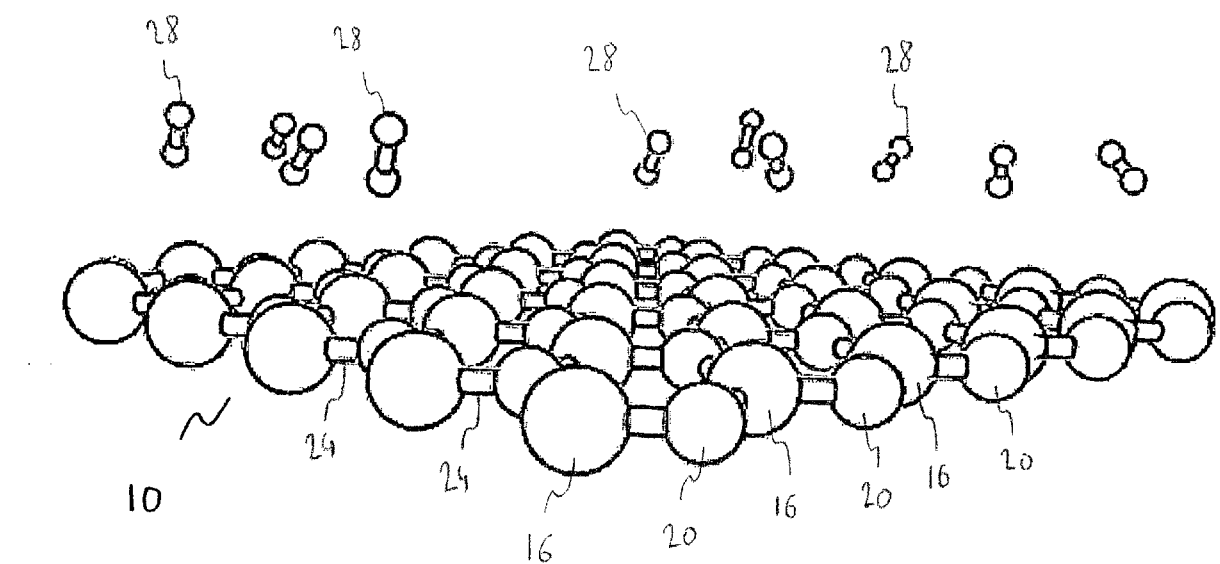
FIG. 2B illustrates a perspective view of a honeycomb nanostructured storage material, displaying the adsorbed hydrogen molecules.

FIGS. 2A and 2B illustrate an embodiment for storing hydrogen in an sp bonded nanostructured storage material 10 with a triangular lattice that has a flat planar network.

FIG. 2A shows the plan view of nanostructured storage material 10 with a triangular lattice structure, without the hydrogen molecules. The chemical composition of nanostructured storage material 10 is of the AB type, an example of which is boron nitride. Light elements 16 and light elements 20 of nanostructured storage material 10 are shown with bigger and smaller empty circles, respectively. Light elements 16 and 20 are coupled with $sp^2$ bonds 24. For a discussion of suitable light elements see below.

FIG. 2B shows a perspective view of the triangular lattice, wherein hydrogen molecules 28 are shown in their bonding position. In some embodiments hydrogen molecules 28 are positioned over the center of the hexagons of the triangular lattice, in other embodiments hydrogen molecules 28 are positioned over a bond or over an atom of the lattice. In some embodiments there is one energetically favored position for hydrogen molecules 28, in other embodiments there are several substantially equivalent positions. In some embodiments the orientation of hydrogen molecules 28 can be parallel to the local plane of the triangular lattice, in other embodiments the orientation can be perpendicular, or it can make some other angle with the local plane of the triangular lattice.

The adsorption properties of hydrogen to nanostructured storage material 10 depend on the nature of $sp^2$ bonds 24. In some embodiments this property is used, when the adsorption properties of hydrogen to nanostructured storage material 10 are improved by modifying $sp^2$ bonds 24.

Embodiments with modified $sp^2$ bonds 24 are described, for example, in U.S. patent application entitled: "Increasing Hydrogen Adsorption For Hydrogen Storage In Nanostructured Materials By Modifying $sp^2$ Covalent Bonds" by Young-Kyun Kwon, Seung-Hoon Jhi, Keith Bradley, Philip G. Collins, Jean-Christophe P. Gabriel, and George Grilner.

In these embodiments $sp^2$ bonds 24 are modified, for example, by forming non-planar structures, by introducing various defects, and by introducing different elements into nanostructured storage material 10. In these embodiments the so far passive additional p electron may hybridize to a small degree with the electrons, which formed the $sp^2$ configuration. Therefore, in these embodiments s bond 24 may acquire a small sp character. Thus, in these embodiments the covalent bonds of nanostructured storage material 10 may be only substantially $sp^2$ bonds.

Figure 3A:
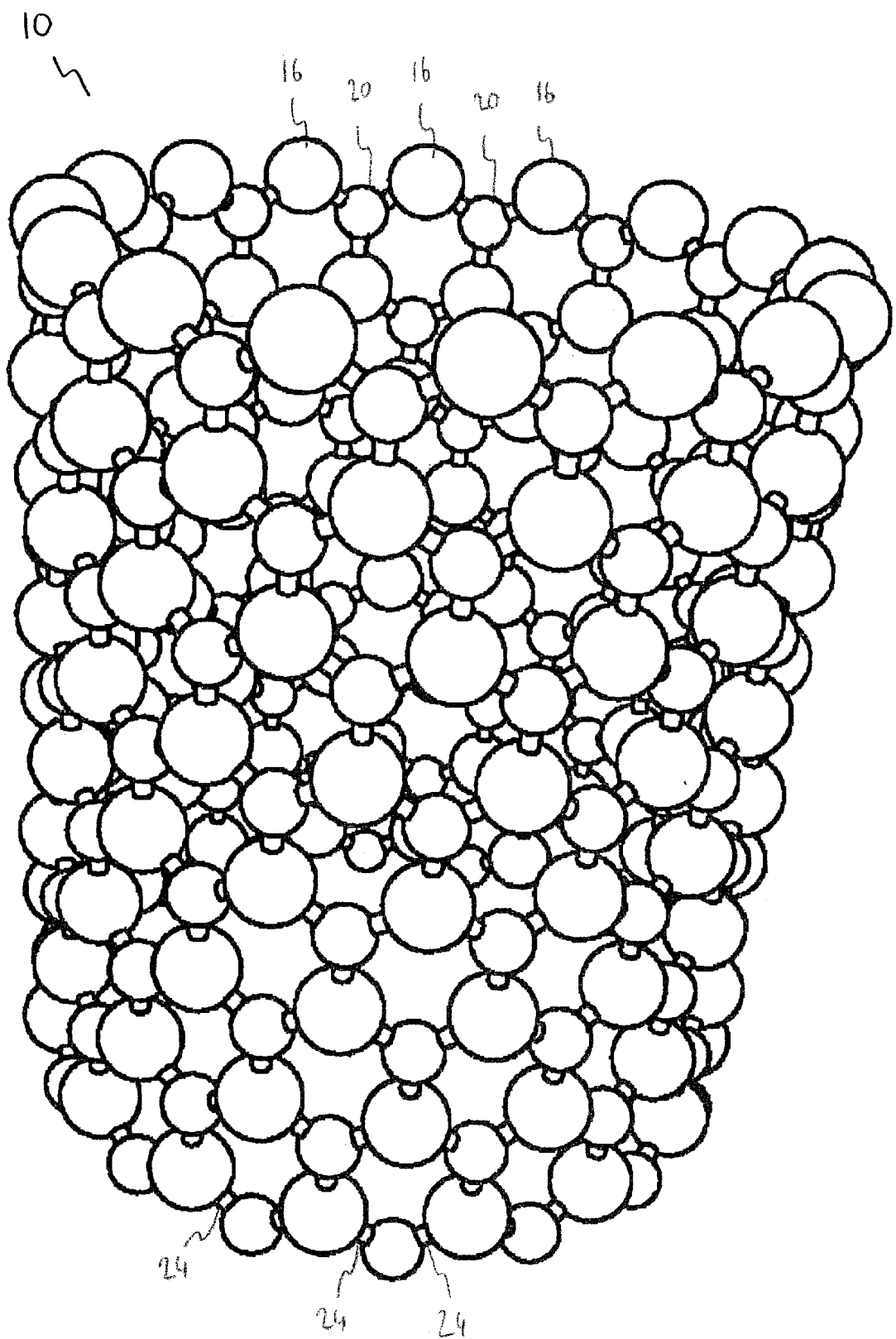
FIG. 3A illustrates a perspective view of a nanotube structure.
Figure 3B:
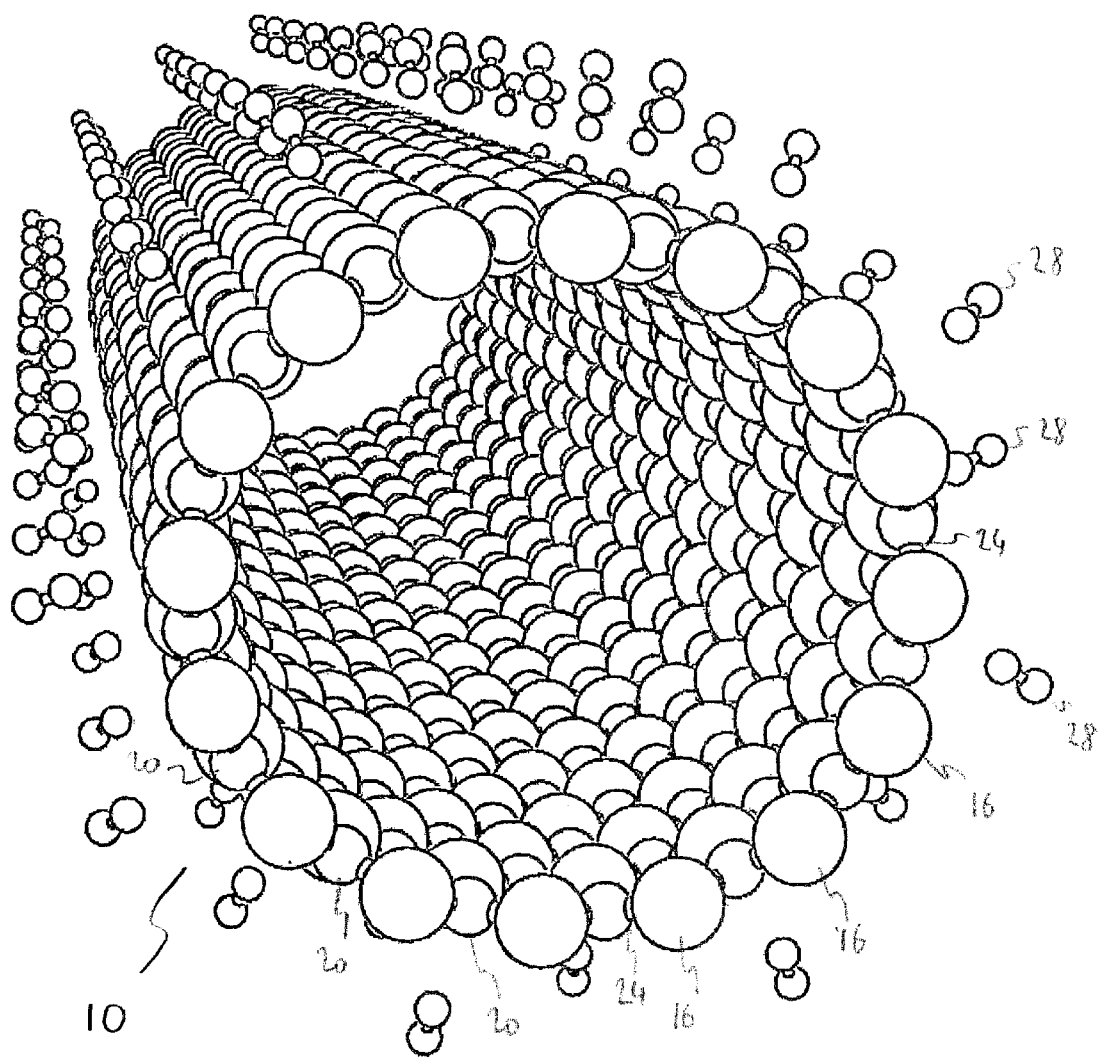
FIG. 3B illustrates a perspective view of a nanotube structure, displaying the adsorbed hydrogen molecules.

FIGS. 3A and 3B illustrate some embodiment for storing hydrogen in an $sp^2$ bonded nanostructured storage material 10 with a planar triangular lattice that has been deformed into a tubular structure, or nanotube.

FIG. 3A shows a perspective view of the nanotube without the hydrogen molecules, where the chemical composition of nanostructured storage material 10 is of the AB type, an example of which is boron nitride. Light elements 16 and light elements 20 of nanostructured storage material 10 are shown with bigger and smaller empty circles, respectively. Light elements 16 and 20 are coupled with $sp^2$ bonds 24.

FIG. 3B shows a perspective view of the nanotube, wherein hydrogen molecules 28 are shown in their bonding position. In some embodiments hydrogen molecules 28 are positioned over the center of the hexagons of the triangular lattice, in other embodiments hydrogen molecules 28 are positioned over a bond or over an atom of the triangular lattice. In some embodiments there is one energetically favored position for hydrogen molecules 28, in other embodiments there are several substantially equivalent positions. In some embodiments the orientation of hydrogen molecules 28 can be parallel to the local plane of the triangular lattice, in other embodiments the orientation can be perpendicular, or it can make some other angle with the local plane of the triangular lattice.

Figure 4A:
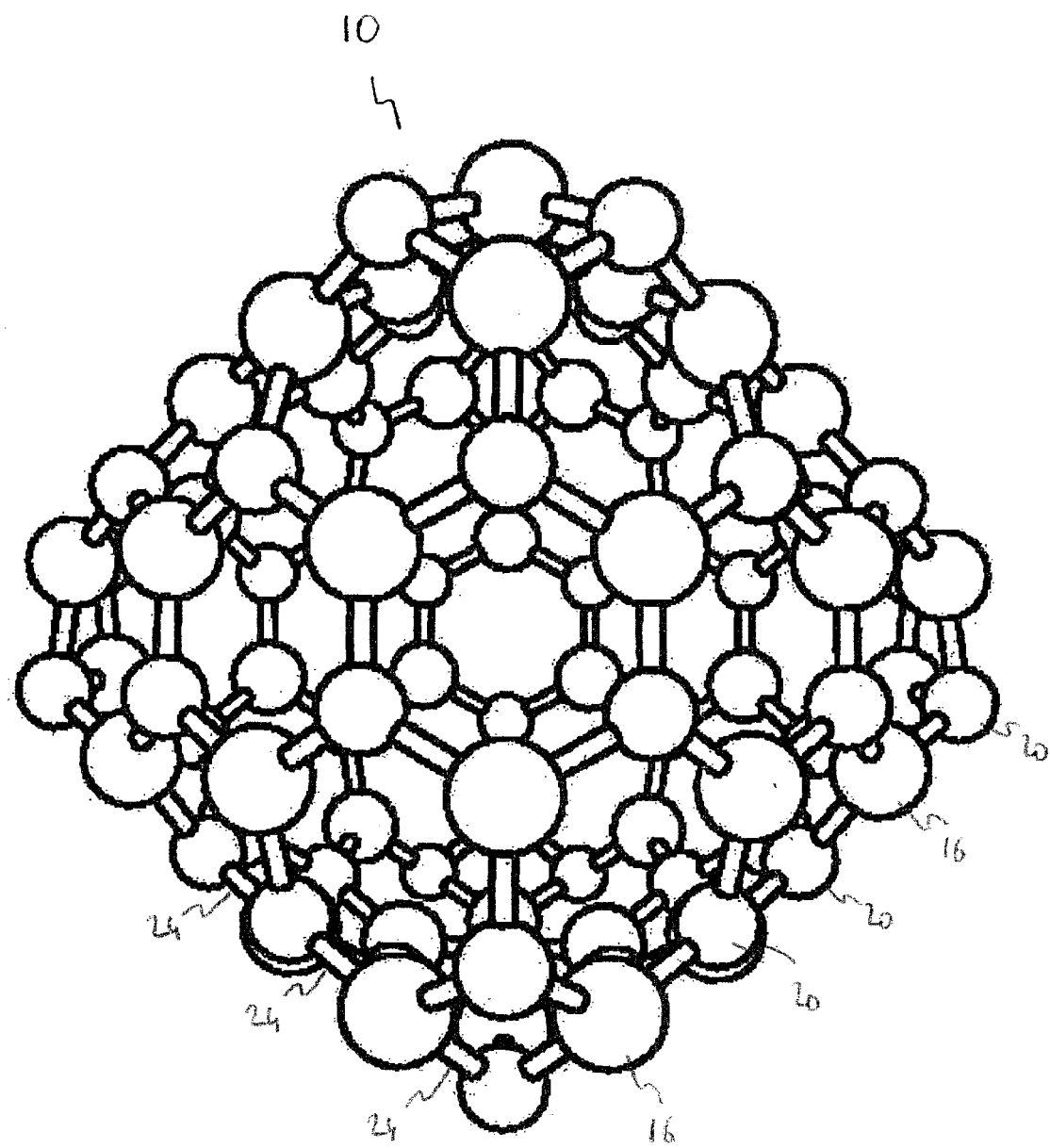
FIG. 4A illustrates a perspective view of a nanocage structure.
Figure 4B:
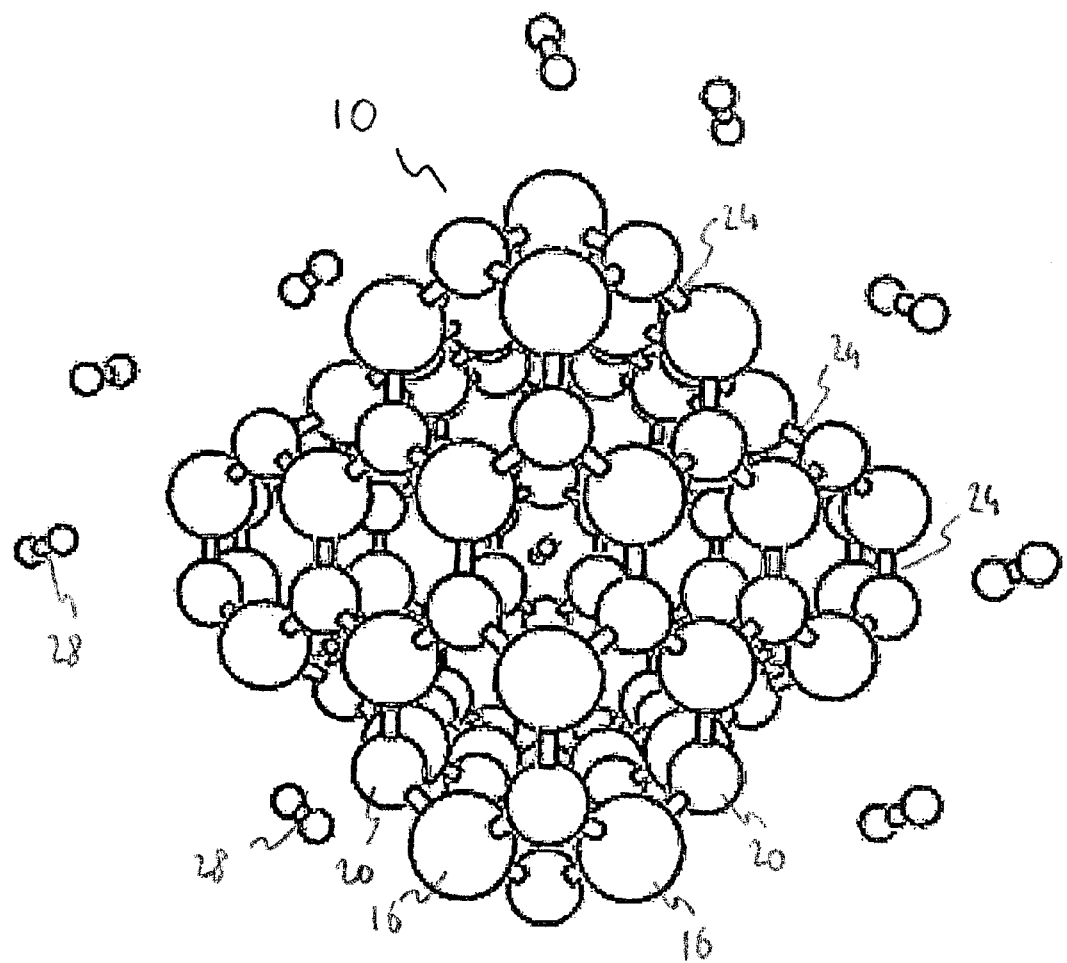
FIG. 4B illustrates a perspective view of a nanocage structure, displaying the adsorbed hydrogen molecules.

FIGS. 4A and 4B illustrate some embodiment for storing hydrogen in an $sp^2$ bonded nanostructured storage material 10 with a planar triangular lattice that has been deformed into a cage structure, or nanocage.

FIG. 4A shows a perspective view of the nanocage without the hydrogen, where the chemical composition of nanostructured storage material 10 is of the AB type, an example of which is boron nitride. Light elements 16 and light elements 20 of nanostructured storage material 10 are shown with bigger and smaller empty circles, respectively. Light elements 16 and 20 are coupled with sp bonds 24.

FIG. 4B shows a perspective view of the nanocage, wherein hydrogen molecules 28 are shown in their bonding position. In some embodiments hydrogen molecules 28 are positioned over the center of the hexagons of the triangular lattice, in other embodiments hydrogen molecules 28 are positioned over a bond or over an atom of the triangular lattice. In some embodiments there is one energetically favored position for hydrogen molecules 28, in other embodiments there are several substantially equivalent positions. In some embodiments the orientation of hydrogen molecules 28 can be parallel to the local plane of the triangular lattice, in other embodiments the orientation can be perpendicular, or it can make some other angle with the local plane of the triangular lattice.

In further embodiments hydrogen can be stored in other forms of nanostructured storage material 10. A non-exhaustive list of possible forms of nanostructured storage material 10 includes:

nanofibers of the following kinds: turbostratic, highly oriented, twisted, straight, curled and rigid;

nanotubes of the following kinds: single walled, double walled, multi walled, with zig-zag chirality, or a mixture of chiralities, twisted, straight, bent, kinked, curled, flattened, and round;

ropes of nanotubes, twisted nanotubes, braided nanotubes;

small bundles of nanotubes (with a number of tubes less than ten), medium bundles of nanotubes (with a number of tubes in the hundreds), large bundles of nanotubes (with a number of tubes in the thousands);

nanotorii, nanocoils, nanorods, nanowires, nanohorns;

empty nanocages, filled nanocages, multifaceted nanocages, empty nanococoons, filled nanococoons, multifaceted nanococoons;

thin nanoplatelets, thick nanoplatelets, intercalated nanoplatelets, with thickness of about 0.3 nm to about 100 nm, and lateral size of about 5 nm to about 500 nm.

All these structures can assume heterogeneous forms. Heterogeneous forms include structures, where one part of the structure has a certain chemical composition, while another part of the structure has a different chemical composition. An example is a multi walled nanotube, where the chemical composition of the different walls can be different from each other.

Heterogeneous forms also include different forms of nanostructured storage material 10, where more than one of the above listed forms are joined into a larger irregular structure. Finally, all above d materials can have cracks, dislocations, branches or other imperfections.

It is understood that the scope of the invention extends to all the above listed and described forms of nanostructured storage material 10.

Economic and practical considerations prefer hydrogen storage systems that are light. In particular, light storage systems have higher storage efficiency in the sense that the weight % of the stored hydrogen is higher in light storage systems. Therefore, embodiments of the present invention include nanostructured storage material 10 composed of light elements. Suitable light elements include elements of the second and third rows of the periodic table: Be, B, C, N, O, F, Mg, P, S, and Cl. The storage efficiency of nanostructured storage material 10 can be enhanced by combining the listed suitable light elements. While Al and Si containing nanostructures, such as zeolites, have been explored before for storage purposes, in some embodiments of the invention Al and Si can be combined with the above light elements.

Some embodiments can contain elements from other rows of the periodic table as well. Some of these elements can be introduced deliberately to enhance a desired property. Other elements may be a residue from the production process, for example, a catalyst. Therefore, it is understood that embodiments of the invention may contain heavier elements in some concentration.

Some embodiments of the invention include $B_xC_yN_z$, where x, y, and z are small integers. Making of this material is described, for example, in "Pyrolytically Grown Arrays of Highly Aligned $B_xC_yN_z$ Nanotubes," by W.-Q. Han, J. Cumings, and A. Zettl in Applied Physics Letters, vol. 78, p. 2769 (2001), and in U.S. Pat. No. 6,231,980 "$B_xC_yN_z$ nanotubes and nanoparticles," by M. Cohen and A. Zettl, which publication and patent are hereby incorporated in their entirety by this reference.

Some embodiments of the invention include BN. Making of this material is described, for example, in "Mass Production of Boron Nitride Double-wall Nanotubes and Nanococoons," by J. Cumings and A. Zettl in Chemical Physics Letters, vol. 316, p. 211 (2000), hereby incorporated in its entirety by this reference.

Some embodiments of the invention include $BC_2N$. Making of this material is described, for example, in "Synthesis of $B_xC_yN_z$ Nanotubules," by Z. Weng-Sieh, K. Cherrey, N. G. Chopra et al., in Physical Review B, vol. 51, p. 11229 (1995), hereby incorporated in its entirety by this reference.

Some embodiments of the invention include $MgB_2$. Making of this material is described, for example, in "Superconducting $MgB_2$ Nanowires," by Y. Wu, B. Messer, and P. Yang in Advanced Materials, vol. 13, p. 1487 (2001), hereby incorporated in its entirety by this reference.

Some embodiments of the invention include $Be_3N_2$. Making of this material is described, for example, in "Die Struktur Einer Neuen Modifikation von $Be_3N_2$," by P. Eckerlin and A. Rabenau in Angewandte Chemie, vol. 304, p. 218 (1960), hereby incorporated in its entirety by this reference.

Some embodiments of the invention include $BeB_2$. Making of this material is described, for example, in "Absence of Superconductivity in $BeB_2$," by I. Felner in Physica C, vol. 353, p. 11 (2001), hereby incorporated in its entirety by this reference.

Some embodiments of the invention include $B_2O$. Making of this material is described, for example, by H. Hall and L. Compton in Inorganic Chemistry, vol. 4, p. 1213 (1965), hereby incorporated in its entirety by this reference.

Some embodiments of the invention include elemental boron. Making of this material is described, for example, by S. La Placa, P. Roland, and J. Wynne in Chemical Physics Letter vol. 190, p. 163 (1992), hereby incorporated in its entirety by this reference.

Some embodiments of the invention include standard materials that are listed in the Chemical Abstract Service (CAS) at the web site: www.cas.org:

TABLE 1

| Chemical composition | CAS number |
| --- | --- |
| BeO | 1304-56-9 |
| $AlCl_3$ | 7784-13-6 |
| $Al_4C_3$ | 1299-86-1 |
| $AlF_3$ | 7784-18-1 |
| $Al_2O_3$ | 1344-28-1 |
| $Al_2S_3$ | 1302-81-4 |
| $Mg_2Si$ | 22831-39-6 |
| $Mg_3N_2$ | 12057-71-5 |
| $Li_3N$ | 26134-62-3 |
| $Li_2S$ | 12136-58-2 |
| $Na_2S$ | 1313-82-2 |
| $Na_2S_4$ | 12034-39-8 |

In the above embodiments of the invention the hydrogen atoms bond to nanostructured storage material 10 by physisorption. Therefore, the present invention differs from U.S. Pat. No. 5,653,951, which describes an invention, where ". . . nanostructures of the present invention store hydrogen by chemisorbing molecular hydrogen in the interstices of the nanostructure" (col.3, 11.40–42).

There are several crucial differences between physisorption and chemisorption. The following comparative table is assembled according to the *Kirk-Othmer Encyclopedia of Chemical Technology*, John Wiley and Sons, (2001):

TABLE 2

| Parameter | Physisorption | Chemisorption |
| --- | --- | --- |
| interaction of adsorption | no electron transfer, adsorption by physical interactions | electron transfer, leading to the formation of a chemical bond between adsorbate and surface |
| activation energy | small, often immeasurable | considerable |
| desorption | rapid, non-activated | slow, activated |

As Table 2 states, chemisorption is a type of adsorption, where an adsorbate is bound to a surface by the transfer of electrons, forming a chemical bond between the adsorbate and atoms of the surface. In contrast, physisorption is a type of adsorption, where an adsorbate is bound to a surface by physical interactions without the transfer of electrons. Physical interactions, giving rise to physisorption, include, but are not restricted to, van der Waals interactions. Van der Waals interactions are operational when the neutral atoms or molecules of the adsorbate and the surface polarize each other, and the polarized atoms or molecules attract each other at some distance.

Accordingly, chemisorptive bonds are strong and physisorptive bonds are weak. This difference manifests itself in the kinetics of the dissolution of the bonds, or desorption. Chemisorptive bonds are dissolved by an activated process, i.e., by thermal activation over an activation energy barrier, which is considerable. For this reason dissolution of chemisorbed bonds proceeds slowly and is not adiabatically reversible.

In contrast, physisorptive bonds are dissolved by a non-activated process. The activation energy is small, in many cases immeasurably small. Hence physisorptive bonds dissolve rapidly and reversibly.

U.S. Pat. No. 5,653,951 discusses in great detail the irreversible aspects of desorption of that invention. The irreversibility of desorption of that invention is illustrated in FIGS. 1A, 1B, 2B, 3A, and 3B by the fact that the sorption and desorption curves do not coincide. Such irreversibility is strong evidence for the chemisorptive nature of hydrogen bonding in U.S. Pat. No. 5,653,951.

Figure 5:
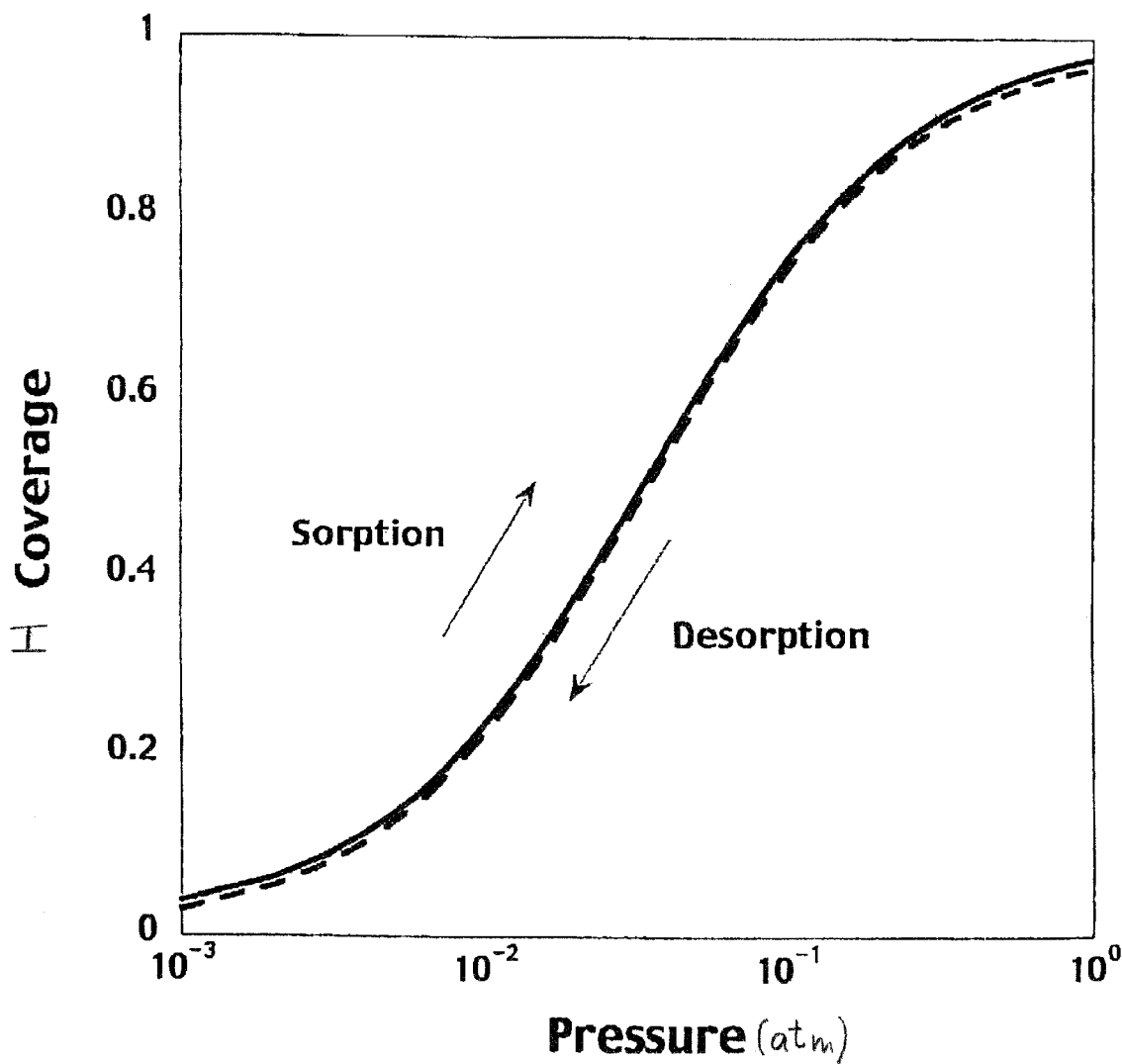
FIG. 5 illustrates the sorption and desorption curves of hydrogen in relation to a nanostructured storage material.

FIG. 5 illustrates the coverage fraction, i.e., the fraction of the adsorbent surface, which is covered by hydrogen, as a function of pressure at a fixed temperature. The solid sorption curve indicates the results for starting at a low pressure value, for example, $10^{-3}$ atm, and measuring the coverage fraction while increasing the pressure. The dashed desorption curve indicates the results for starting at a high pressure value, for example, 1 atm, and measuring the coverage fraction while decreasing the pressure.

In contrast to U.S. Pat. No. 5,653,951, as shown in FIG. 5, the sorption and desorption curves of the present invention substantially coincide, indicating that the adsorption occurs by physisorption.

The above embodiments can be manufactured by different techniques. The two main acts of manufacturing are the making of nanostructured storage material 10 and the subsequent purifying of nanostructured storage material 10.

According to some methods of the invention, the making of nanostructured storage material 10 starts by providing the bulk material with the desired chemical composition in polycrystalline or micrograined form. The bulk material is then loaded into a ball mill. The balls of the ball mill can be stainless steel balls or hard ceramic balls, with a diameter of, for example, about 3 mm. The material can be milled for an extended period, for example, 24 hours. The milling can take place in air, in vacuum, or in reactive gases. The resulting material will contain some nanostructured storage material 10, which can be separated by subsequent purifying.

According to some other methods of the invention, the making of nanostructured storage material 10 starts with providing a bulk material in powder form. In some embodiments the bulk material has the desired chemical composition, in others the bulk material contains some of the desired ingredients. The powdered bulk material is pressed into a shape, suitable for functioning as an electrode, an example of such a shape being a rod. The rod is then used as an electrode to construct an arc chamber. The construction of such an arc chamber is described, for example, in "A Mass Production of Boron Nitride Double Wall Nanotubes and Nanocacoons," by J. Cumings and A. Zetti in Chemical Physics Letters, vol. 316, p. 211 (2000). The arc chamber can be filled up with inert gases, for example, helium. In some embodiments the arc chamber can be filled up by one or more reactive gas. For example, beryllium nitride, $Be_3N_2$, could be made in an arc chamber whose electrode contains beryllium and where the chamber contains nitrogen gas.

Subsequent purifying of nanostructured storage material 10 can be performed by many methods. Some purifying methods are described by A. Dillon et al. in Advanced Materials, vol.11, p. 1354 (1999), G. Duesberg et al. in Applied Physics A, vol. 67, p. 117 (1998), K. Shelimov et al. in Chemical Physics Letters, vol. 282, p. 429 (1998), J. Tak et al. in Chemical Physics Letters, vol. 344, p. 18 (2001), P. Young et al. in Carbon, vol. 39, p. 655 (2001), which publications are hereby incorporated in their entirety by this reference. Purifying methods are capable of extracting nanostructured storage material 10 of a particular class and form, for example, corresponding to the above list of nanostructured storage materials 10.

Figure 6:
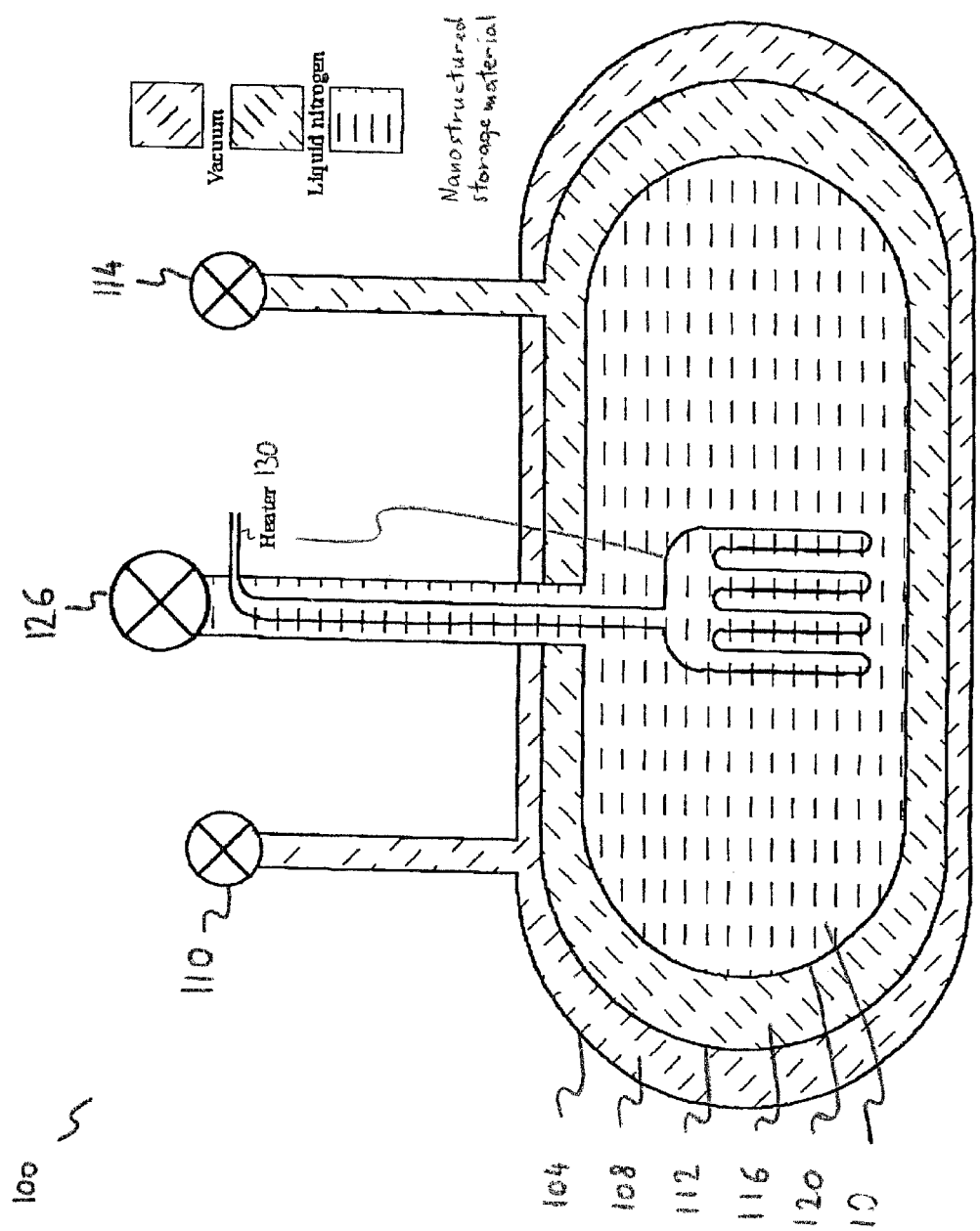
FIG. 6 illustrates a cooled hydrogen storage system.

FIG. 6 illustrates an embodiment of a hydrogen storage system 100 according to the invention. An outer container 104 contains vacuum in outer region 108 to insulate the internal parts of hydrogen storage system 100 from the heat of the environment. The vacuum in outer region 108 can be controlled through vacuum valve 110. A pump can be coupled to vacuum valve 110 to reduce the pressure in outer region 108. In some embodiments the pressure in outer region 108 is between about $10^{-9}$ atm and $10^{-1}$ atm, for example, $10^{-6}$ atm.

Middle container 112 contains a cooling substance 116 to provide cooling of hydrogen storage system 100. Cooling substance 116 can be, for example, liquid nitrogen.

Cooling systems utilizing liquid nitrogen have multiple advantages over systems utilizing liquid helium. Liquid nitrogen is much cheaper per liter than liquid helium. Nitrogen becomes a liquid at 77 K, whereas helium becomes a liquid at 4.2 K. It requires much less energy to cool a system to a temperature of 77 K, than to a temperature of 4.2 K. It also requires a much simpler, and therefore lighter cooling apparatus to maintain a temperature of 77 K, than to maintain a temperature of 4.2 K.

Cooling valve 114 is used to control the cooling substance. For example, cooling substance 116 can be supplied through cooling valve 114, and the evaporated excess cooling substance 116 can be released through cooling valve 114. In embodiments that use different hydrogen storage materials other cooling substances 116 may be utilized.

Inner container 120 contains nanostructured storage material 10. Nanostructured storage material 10 can be any embodiment described above or a combination thereof. In some embodiments nanostructured storage material 10 substantially fills up inner container 120. In other embodiments nanostructured storage material 10 is combined with a hydrogen distribution system, which provides paths for the hydrogen to flow efficiently across the volume of nanostructured storage material 10. The hydrogen distribution system can be, for example, a hierarchical network of tubes of varying diameters to facilitate the efficient flow of hydrogen.

A hydrogen valve 126 is used to control the hydrogen gas. Hydrogen storage system 100 can be filled by coupling hydrogen valve 126 to a hydrogen container through a pump.

Figure 7:
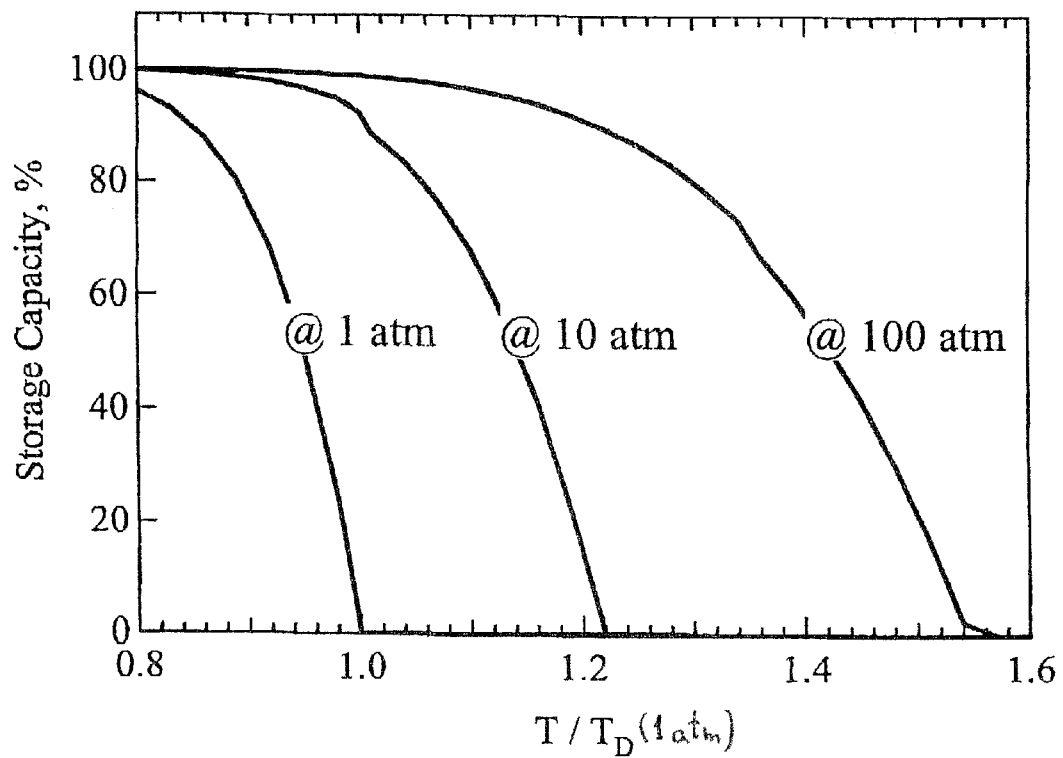
FIG. 7 illustrates the temperature dependence of the hydrogen storage capacity in nanostructured storage materials.

FIG. 7 illustrates the hydrogen storage capacity in percents in nanostructured storage material 10 as a function of the temperature. The amount of stored hydrogen is normalized with the amount stored at zero temperature. The curves refer to pressures of 1 atm, 10 atm, and 100 atm. FIG. 7 illustrates that as the temperature is increased from a low value, hydrogen starts the desorption at a relatively well defined desorption temperature $T_D$. The value of $T_D$ depends on the pressure, as shown. When the temperature is raised to about 120% of $T_D$ at 1 atm, and to about 150% of $T_D$ at 100 atm, substantially all hydrogen is released. The value of $T_D$ is about 60 K for carbon nanostructures and higher for boron nitride nanostructures. In FIG. 7 the temperature is given relative to the desorption temperature $T_D$ at 1 atm, $T_D(1$ atm$)$.

The amount of hydrogen adsorbed in a storage material can be characterized by the percentage wise weight increase of the storage system caused by the adsorption of hydrogen, in units of weight %.

Several papers addressed the storage of hydrogen in nanostructures at ambient temperatures. For most nanostructured materials the desorption temperature is well below ambient temperature, in accordance with the fact that physisorptive bonds are weak. Therefore, the amount of hydrogen stored in these nanostructures at ambient temperature is rather small. For example, M. Ashraf Imam and R. Loufty report in "Hydrogen Adsorption of Different Types of Nanotubes," on p. 40 of the Procedings of NT'01r, the International Workshop of on the Science and Applications of Nanotubes, hereby incorporated in its entirety by this reference, that single walled nanotubes adsorb hydrogen in an amount between about 0.30 weight % and about 0.50 weight %.

In contrast, embodiments of the invention store hydrogen in cooled storage systems at temperatures below the desorption temperature, enabling the storage of much larger quantities. In the above units hydrogen adsorption below the desorption temperature in some embodiments is between about 3 weight % and about 27 weight %, for example, 7.5 weight %. Operating hydrogen storage system 100 below the desorption temperature enhances the storage capacity by a factor of 30 or more in comparison to operating the hydrogen storage system 100 at ambient temperatures.

At the same time embodiments of the invention are operated at or above liquid nitrogen temperatures, and thus do not require the use of liquid helium for cooling purposes. As discussed above, cooling systems using liquid nitrogen have many advantages over cooling systems using liquid helium.

Storage systems that advantageously use liquid nitrogen as cooling substance 116 require nanostructured storage materials 124 that have a desorption temperature above 77 K. The desorption temperature of nanostructured storage material 10 depends on its chemical composition. In particular, while pure;carbon nanostructures typically have desorption temperatures below 77 K, embodiments that use nanostructured storage materials 124 formed from a combination of light elements have desorption temperatures well above 77 K. For example, boron nitride has a desorption temperature which is about 30% higher than that of carbon.

Storage systems with higher desorption temperatures require less energy for their operation. In particular, storage systems with desorption temperatures at or above the ambient temperature do not require a cooling system, making the storage system much lighter. Suitable selection of the chemical composition of nanostructured storage material 10 may increase the desorption temperature to ambient temperature.

The operation of hydrogen storage system 100 includes filling up the system with hydrogen and recovering stored hydrogen from the system.

Hydrogen storage system 100 can be filled up by coupling hydrogen valve 126 to a hydrogen container through a pump. Nanostructured storage material 10 is cooled by cooling susbstance 116 to temperatures below the desorption temperature. When the pressure of the pump is raised to a suitable value, hydrogen from the hydrogen container will be pumped into inner container 120, where it will adsorb to nanostructured storage material 10. Suitable pressure values can lie in the range of, for example, about 1 atm to about 20 atm.

Hydrogen can be recovered from hydrogen storage system 100 by various methods. Some embodiments recover the hydrogen by heating nanostructured storage material 10 with heater 130. Heater 130 can be, for example, a resistor, driven by a current. The longer the current is applied to heater 130, or the more current is applied to heater 130, the higher the temperature of nanostructured storage material 10 will rise. As the temperature rises above the desorption temperature, hydrogen will desorb from nanostructured storage material 10, and can be recovered through hydrogen valve 126. In some other embodiments simply the leakage heat, leaking into inner container 120 from the outside, can be used to drive the desorption of hydrogen.

Although the various aspects of the present invention have been described with respect to certain embodiments, it is understood that the invention is entitled to protection within the full scope of the appended claims.

We claim:

1. A hydrogen storage nanostructure, comprising:
    a nanostructured storage material, comprising
        at least one light element, wherein the at least one light element is selected from the group consisting of Be, B, N, P, and S, wherein
        the nanostructured storage material is adapted to adsorb hydrogen by physisorption.

2. A hydrogen storage system, comprising:
    a container; and
    a nanostructured storage material, disposed within the container, wherein
        the nanostructured storage material comprises a plurality of light elements, wherein the light elements are selected from the group consisting of Be, B, C, N, O, F, Mg, P, S, and Cl; and
        the nanostructured storage material is adapted to adsorb hydrogen by physisorption.

3. The hydrogen storage system of claim 2, wherein the nanostructured storage material is adapted to adsorb hydrogen without the formation of a chemical bond.

4. The hydrogen storage system of claim 2, wherein the nanostructured storage material is adapted to adsorb hydrogen by van der Waals interactions.

5. The hydrogen storage system of claim 2, wherein the chemical composition of the nanostructured storage material is selected from the group consisting of $B_xC_yN_z$, BN, $BC_2N$, $MgB_2$, $Be_3N_2$, $BeB_2$, $B_2O$, B, BeO, $AlCl_3$, $Al_4C_3$, $AlF_3$, $Al_2O_3$, $Al_2S_3$, $Mg_2Si$, $Mg_3N_2$, $Li_3N$, $Li_2S$, $Na_2S$, and $Na_2S_4$, wherein
    the nanostructured storage material has a chemical composition; and x, y, and z are integers.

6. The hydrogen storage system of claim 5, wherein the chemical composition of the nanostructured storage material is such that the desorption temperature of hydrogen in relation to the nanostructured storage material is greater than the liquefaction temperature of nitrogen, wherein hydrogen has a desorption temperature in relation to the nanostructured storage material.

7. The hydrogen storage system of claim 2, wherein the nanostructured storage material comprises:
    a network of the plurality of light elements coupled with covalent bonds.

8. The hydrogen storage system of claim 7, wherein the covalent bonds comprise:
    substantially $sp^2$ bonds.

9. The hydrogen storage system of claim 2, wherein the nanostructured storage material comprises:
    a layered network of the plurality of light elements.

10. The hydrogen storage system of claim 9, wherein the layered network comprises:
    at least one of a triangular lattice, a nanofiber, a nanoplatelet, a single walled nanotube, a multi walled nanotube, a nanocage, a nanococoon, a nanohorn, a nanorope, a nanotorus, a nanocoil, a nanorod, a nanowire, and a fullerene.

11. The hydrogen storage system of claim 10, wherein the at least one of a triangular lattice, a nanofiber, a nanoplatelet, a single walled nanotube, a multi walled nanotube, a nanocage, a nanococoon, a nanohorn, a nanorope, a nanotorus, a nanocoil, a nanorod, a nanowire, and a fullerene-like molecule is in heterogeneous form.

12. The hydrogen storage system of claim 2, wherein the nanostructured storage material is combined with a hydrogen distribution system within the container.

13. The hydrogen storage system of claim 2, further comprising:
    a cooling system, capable of cooling the nanostructured storage material below the desorption temperature of hydrogen in relation to the nanostructured storage material .

14. The hydrogen storage system of claim 13, wherein the cooling system comprises:
    a middle container, disposed within the container;
    a heat insulator, disposed between the container and the middle container, capable of reducing the exchange of heat between the container and the middle container;
    an inner container, disposed within the middle container; and
    a cooling substance, disposed between the middle container and the inner container, capable of reducing the temperature of the inner container.

15. The hydrogen storage system of claim 14, wherein the heat insulator is a gaseous substance, having a pressure less than $10^{-1}$ atm.

16. The hydrogen storage system of claim 14, wherein the cooling substance is liquid nitrogen.

17. The hydrogen storage system of claim 14, further comprising:
    a heat insulating valve, coupled to the container, capable of controlling the heat insulator;
    a cooling valve, coupled to the middle container, capable of controlling the cooling substance; and
    a hydrogen valve, coupled to the inner container, capable of controlling the hydrogen.

18. The hydrogen storage system of 14, further comprising:
    a heater, disposed within the inner container, capable of controlling the temperature of the nanostructured storage material.

19. The hydrogen storage system of claim 14, further comprising:
    a fuel cell, wherein the hydrogen recovered from the hydrogen storage system is used in the fuel cell to generate energy.

20. A hydrogen storage system, comprising:
    container means; and
    nanostructured storage means, disposed within the container means, wherein
        the nanostructured storage means comprises a plurality of light elements, wherein the light elements are selected from the group consisting of Be, B, C, N, O, F, Mg, P, S, and Cl; and
        the nanostructured storage means is adapted to adsorb hydrogen by physisorption.

21. A hydrogen storage system, comprising:
    a container; and
    a nanostructured storage material, disposed in the container, wherein
        the nanostructured storage material comprises at least one light element, wherein
            the at least one light element is selected from the group consisting of Be, B, N, P, and S; and
            the nanostructured storage material is adapted to adsorb hydrogen by physisorption.

22. A hydrogen storage nanostructure, comprising:

a nanostructured storage material, comprising a plurality of light elements, wherein the light elements are selected from the group consisting of Be, B, C, N, O, F, Mg, Al, Si, P, S; and Cl, wherein the nanostructured storage material Is not a microporous material or zeolite, wherein the nanostructured storage material is adapted to adsorb hydrogen by physisorption.

23. A method of storing hydrogen, the method comprising:

providing a nanostructured storage material in a container, the nanostructured storage material comprising:

a plurality of light elements, wherein the light elements are selected from the group consisting of Be, B, C, N, O, F, Mg, P, S, and Cl; and introducing hydrogen into the nanostructured storage material, wherein the hydrogen adsorbs to the nanostructured storage material by physisorption.

24. The method of claim 23, wherein providing the nanostructured storage material comprises:

selecting the chemical composition of the nanostructured storage material so that the desorption temperature of hydrogen in relation to the nanostructured storage material is greater than the liquefaction temperature of nitrogen, wherein hydrogen has a desorption temperature in relation to the nanostructured storage material, and wherein the nanostructured storage material has a chemical composition.

25. The method of claim 23, wherein providing the nanostructured storage material comprises:

providing the nanostructured storage material in combination with a hydrogen distribution system within an inner container.

26. The method of claim 23, further comprising:

cooling the nanostructured storage material below the desorption temperature of the hydrogen in relation to the nanostructured storage material.

27. The method of claim 26, wherein cooling the nanostructured storage material comprises:

providing a middle container, disposed within the container;

providing a heat insulator, disposed between the container and the middle container, capable of reducing the exchange of heat between the container and the middle container;

providing an inner container, disposed within the middle container; and providing a cooling substance, disposed between the middle container and the inner container, capable of reducing the temperature of the inner container.

28. The method of claim 27, wherein providing the cooling substance comprises:

providing liquid nitrogen, as a cooling substance.

29. The method of claim 27, further comprising:

controlling the heat insulator with a heat insulating valve, coupled to the container;

controlling the cooling substance with a cooling valve, coupled to the middle container; and controlling the hydrogen with a hydrogen valve, coupled to the inner container.

30. The method of claim 27, further comprising:

controlling the temperature of the nanostructured material with a heater, disposed within the inner container.

* * * * *

UNITED STATES PATENT AND TRADEMARK OFFICE
CERTIFICATE OF CORRECTION

PATENT NO. : 6,672,077 B1
APPLICATION NO. : 10/020392
DATED : January 6, 2004
INVENTOR(S) : Bradley et al.

It is certified that error appears in the above-identified patent and that said Letters Patent is hereby corrected as shown below:

On the title page, item (54), please replace "NANOSTRUCTURE" with --NANOSTRUCTURES--

At column 2, line 11, please replace "s" with --$sp^2$--.

At column 4, line 8, please replace "sp" with --$sp^2$--.

At column 4, line 50, please replace "s" with --$sp^2$--.

At column 4, line 51, please replace "sp" with --$sp^3$--.

At column 5, line 23, please replace "sp" with --$sp^2$--.

At column 10, line 7, please replace "NT01r" with --NT01--.

At column 10, line 34, please replace "pure;carbon" with --pure carbon--.

Signed and Sealed this

Twenty-ninth Day of May, 2007

JON W. DUDAS
*Director of the United States Patent and Trademark Office*